United States Patent [19]

Seely et al.

[11] Patent Number: 4,551,782

[45] Date of Patent: Nov. 5, 1985

[54] METHOD AND APPARATUS FOR DEGAUSSING MAGNETIC STORAGE MEDIA

[75] Inventors: Earle S. Seely, Boonton; Roger O. LaValley, Hopatcong, both of N.J.

[73] Assignee: RFL Industries, Inc., Boonton, N.J.

[21] Appl. No.: 607,681

[22] Filed: May 7, 1984

Related U.S. Application Data

[63] Continuation-in-part of Ser. No. 530,658, Sep. 9, 1983.

[51] Int. Cl.⁴ .............................................. H01F 13/00
[52] U.S. Cl. ..................................... 361/151; 335/284
[58] Field of Search ............... 361/143, 149, 150, 151; 335/284

[56] References Cited

U.S. PATENT DOCUMENTS

| | | |
|---|---|---|
| 245,275 | 8/1881 | Caldwell et al. . |
| 733,637 | 7/1903 | Forster . |
| 2,240,749 | 5/1941 | Beechlyn . |
| 2,786,970 | 3/1957 | Connoy . |
| 3,023,280 | 2/1962 | Tronslin et al. ..................... 361/151 |
| 3,143,689 | 8/1964 | Hall . |
| 3,321,586 | 5/1967 | Krones . |
| 3,588,623 | 6/1971 | Camras ............................... 361/151 |
| 3,619,729 | 11/1971 | Littwin . |
| 3,647,990 | 3/1972 | Eul, Jr. et al. . |
| 3,651,382 | 3/1972 | Trammell . |
| 3,655,924 | 4/1972 | Puskas . |
| 3,723,668 | 3/1973 | Ritchey, Jr. . |
| 3,810,230 | 5/1974 | Orlowski et al. . |
| 3,938,011 | 2/1976 | Littwin ............................... 361/151 |
| 3,958,273 | 5/1976 | Alexandrovich, Sr. et al. . |
| 4,135,219 | 1/1979 | Yoshizawa et al. . |
| 4,157,581 | 6/1979 | Keiichi et al. . |
| 4,346,426 | 8/1982 | Baumann et al. ................... 361/151 |
| 4,360,854 | 11/1982 | Schergen et al. . |
| 4,458,178 | 7/1984 | Tenney et al. ................... 361/150 X |
| 4,466,027 | 8/1984 | Howell et al. . |

FOREIGN PATENT DOCUMENTS

| | | |
|---|---|---|
| 159191 | 7/1953 | Australia . |
| 2047005 | 11/1980 | United Kingdom . |

Primary Examiner—Harry E. Moose, Jr.
Attorney, Agent, or Firm—Martin M. Novack

[57] ABSTRACT

A method for degaussing a magnetic storage medium, such as a reel of magnetic tape, is disclosed. In the disclosed method, the reel of magnetic tape is simultaneously rotated on its axis and subjected to an applied transverse magnetic field substantially in the plane of the reel. The transverse magnetic field is applied first in one direction and then in the opposite direction. An axial magnetic field, substantially parallel to the axis of the reel, is then applied, first in one direction and then in the opposite direction. In the preferred embodiment, the step of applying an axial magnetic field includes applying axial magnetic fields in alternating directions at successively decreasing amplitudes. In the disclosed apparatus, the transverse magnetic field is obtained using a lateral coil which passes over and under the reel and covers about half the reel. The axial magnetic field is obtained using a ring-shaped coil surrounding the periphery of the reel. The sequence and characteristics of the applied magnetic fields as disclosed, are useful in obtaining a magnetic storage medium that is completely erased and leaves no significant amount of noise.

27 Claims, 5 Drawing Figures

METHOD AND APPARATUS FOR DEGAUSSING MAGNETIC STORAGE MEDIA

BACKGROUND OF THE INVENTION

This is a continuation-in-part of U.S. application Ser. No. 530,658 filed Sept. 9, 1983. This invention relates to improvements in techniques for erasing information stored on magnetic storage media.

There are many applications in which it is necessary to erase information on a magnetic storage medium, such as magnetic tapes, or the like. It is known, for example, that magnetic tape or tracks on a magnetic disc, can be erased or "degaussed" by applying magnetic fields of opposite polarity across the tape or across magnetic disc tracks. In some applications, such as where the information to be erased is unclassified data, voice, music, etc., the thoroughness of the erasing technique may not be particularly important. On the other hand, for applications wherein the information to be erased is classified data, it is very important that the data be completely erased. However, there has generally been a problem in the prior art in attaining reliable and complete erasure of information from magnetic storage media. The thoroughness of erasure, including removal of noise, is also important in applications where information having a high signal-to-noise ratio, for example a high quality video signal, is to be subsequently recorded on the magnetic storage medium.

The configuration of the particular magnetic storage medium to be erased is an important factor in determining whether or not a given technique may be suitable for achieving sufficient erasing of information. For example, in some prior art systems it is necessary to have erasing heads or coils in close proximity to strips or tracks of magnetic media which may not be readily accessible, due to such factors as the sealing of the magnetic medium in an enclosure or the shape or packaging configuration of the magnetic medium as compared to the design of a particular erasing apparatus.

A further factor that is significant is the time and effort needed to implement the erasing of magnetic media. Prior art techniques which erase a strip or track at a time are usually slow, and may require periodic operator intervention or monitoring.

The efficient erasing of reels of magnetic tape, without the need for unwinding the reel to access the full length of tape, has not been sufficiently achieved in the prior art. The residual presence of noise on the tape, or portions thereof, depending on the type and manner of application of degaussing fields applied, has been a continuing problem.

It is an object of the present invention to provide solution to the problems of the prior art, as set forth.

SUMMARY OF THE INVENTION

The present invention is directed to an improved method and apparatus for degaussing a magnetic storage medium, such as a reel of magnetic tape. In accordance with the method of the invention, the reel of magnetic tape is simultaneously rotated on its axis and subjected to a transverse magnetic field substantially in the plane of the reel. The transverse magnetic field is applied first in one direction and then in the opposite direction. An axial magnetic field, substantially parallel to the axis of the reel, is then applied, first in one direction and then in the opposite direction.

In the preferred embodiment of the invention, the step of applying an axial magnetic field comprises applying axial magnetic fields in alternating directions at successively decreasing amplitudes. In this embodiment, the transverse magnetic field preferably has a field strength of at least 1500 oersteds, and the initial axial magnetic field preferably has a field strength of at least 1500 oersteds. Further, the magnetic tape reel is rotated at a rate of at least 1000 revolutions per minute.

In an embodiment of the apparatus of the invention, the transverse magnetic field is obtained using a lateral coil which passes over and under the reel and covers about half the reel. In this embodiment, the axial magnetic field is obtained using a ring-shaped coil surrounding the periphery of the reel.

Applicant has found that the sequence and characteristics of the applied magnetic fields are important in obtaining a magnetic storage medium that is completely erased and leaves no significant amount of noise.

Further features and advantages of the invention will become more readily apparent from the following detailed description when taken in conjunction with the accompanying drawings.

DESCRIPTION OF THE PREFERRED EMBODIMENT

Figure 1:
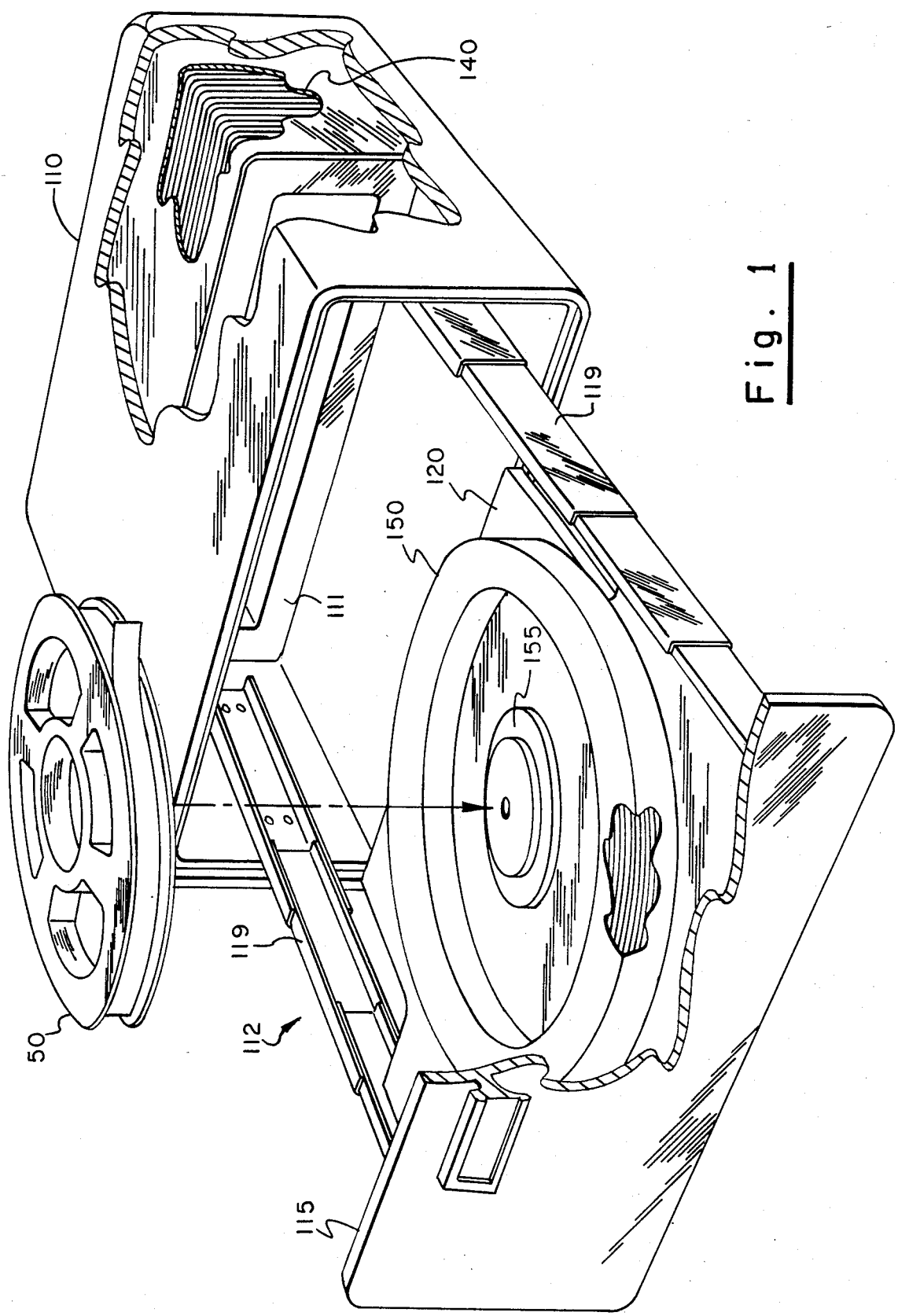
FIG. 1 is an elevational perspective view, partially broken away, of an embodiment of an apparatus in accordance with the invention and which can be used to practice the method of the invention.
Figure 2:
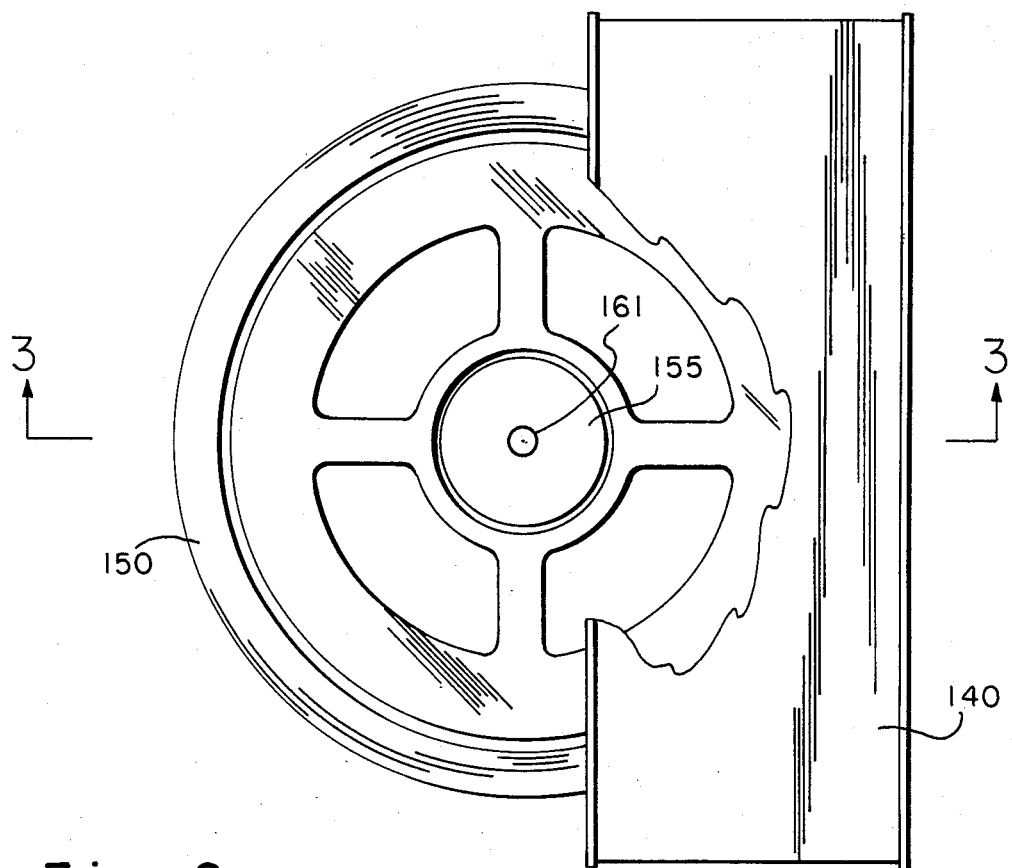
FIG. 2 is a top view of the lateral coil and tape reel of the apparatus of FIG. 1.
Figure 3:
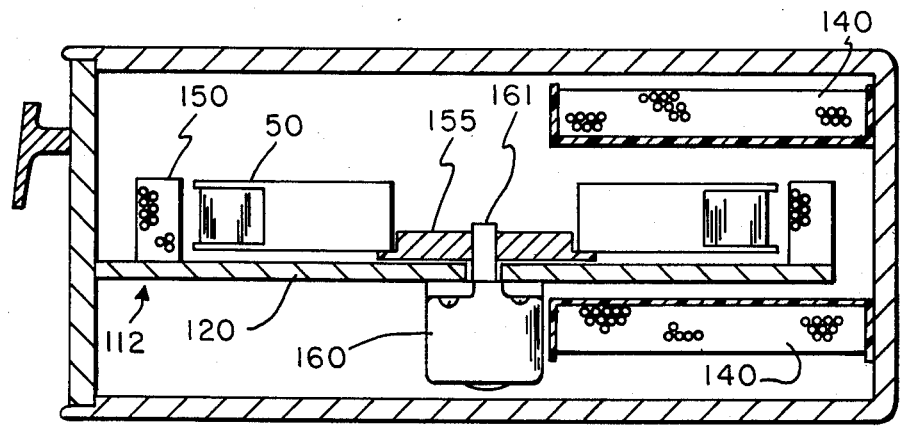
FIG. 3 is a cross-sectional view, as taken through a section defined by 3—3 in FIG. 2, of the apparatus of FIGS. 1 and 2.

Referring to FIGS. 1, 2, and 3, there is shown an apparatus in accordance with an embodiment of the invention, and which can be used to practice the method of the invention. A housing 110 is provided, and contains a slideable drawer 112 which includes a slideable base 120 and a front panel 115. The base 120 is slideable on rails 119 so that the drawer can be opened, for loading or unloading of a tape reel 50, and closed for the degaussing operation. Suitable interlocks (not shown) can be provided so that opening of the drawer 112 is prevented during the degaussing operation. In FIG. 1, the drawer 112 is shown opened, and in FIG. 3 the drawer is shown closed. Mounted generally centrally in the base 120 of drawer 112 is a motor 160 having a shaft which passes through an aperture in the base 120, and is coupled to a hub 155. When the motor is turned on, the hub can rotate at a high speed, for example, 2000 revolutions per minute, on bearings (not shown). Also mounted on the base 120 is a ring-shaped coil 150 which has an inner diameter that is somewhat larger than the outer diameter of the tape reel 50.

The housing 110 contains, in the rear half thereof, a lateral coil 140 which, as seen in FIGS. 2 and 3, has generally flat upper and lower surfaces which pass over and under the approximately half of the tape reel which is inserted furthest into the housing when the drawer 112 is closed. A separating frame 111 is provided adjacent the coil, and the rear portion of base 120 is configured to fit therethrough.

The housing and drawer may be formed, for example, of aluminum or other suitable non-magnetic materials, such as plastics.

After a reel of magnetic tape is inserted and the drawer is closed, operation can be implemented manually or automatically, as described hereinbelow. Briefly, a first step in the degaussing procedure involves simultaneously rotating the magnetic tape reel on its axis and applying a transverse magnetic field substantially in the plane of the reel, using the lateral coil 140, the magnetic field being applied first in one direction and then in the opposite direction. The transverse magnetic field includes a radial component through the tape surface that is beneficial in erasing components of information and noise on the tape. The magnetic field strength is preferably at least about 1500 oersteds. Since a field of this strength is difficult to sustain for a long duration, a high speed of rotation of the tape ensures that all of the tape will be subjected to a relatively high magnetic field strength. A rotational rate of at least 1000 revolutions per minute is preferred and, as noted above, 2000 revolutions per minute is the rate used in the present embodiment. This avoids residual noise which is found to occur if the field is applied non-uniformly. Next, an axial magnetic field is applied substantially parallel to the axis of the magnetic tape reel. The ring-shaped coil 150 provides a field having the desired component, the axial magnetic field being applied first in one direction and then in the opposite direction. Preferably, the axial magnetic fields are applied in alternating directions at successively decreasing amplitudes. This degaussing of the magnetic tape, generally in the plane of the tape, in combination with the previously described degaussing through the tape, is found to result in a tape with very low noise levels. The initial axial magnetic field preferably has a field strength of at least 1500 oersteds. Decrements of about 20% of the previous field strength can be used for successive applications of the alternating axial magnetic field, until the field strength is about 20% of its initial amplitude.

Figure 4:
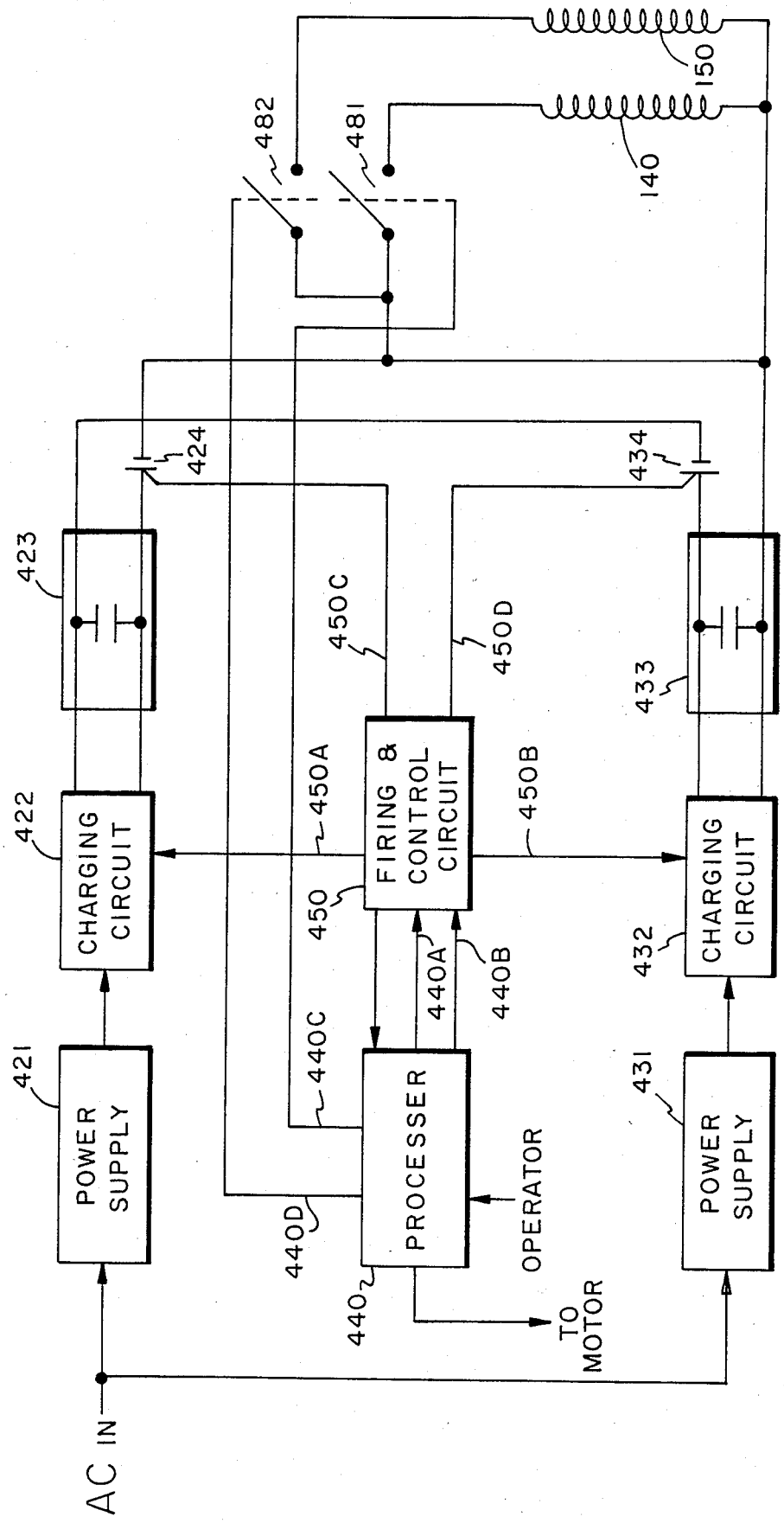
FIG. 4 is a block diagram showing the electronic subsystem of the apparatus of the invention, and which can be used to practice the method of the invention.

FIG. 4 shows the electronic subsystem of an apparatus in accordance with an embodiment of the invention, and which can be used to practice the method of the invention. A source of AC power is coupled to power supplies 421 and 431, whose outputs are respectively coupled to charging circuits 422 and 432. The charging circuits 422 and 432 are enabled by outputs on lines 450A and 450B of firing and control circuit 450. The charging circuits 422 and 432 and the firing and control circuit 450 may be, for example, of the type available from RFL Industries, Inc. of New Jersey, such as their Model No. 595. The outputs of charging circuits 422 and 432 are respectively coupled to capacitor banks 423 and 433. The output of capacitor bank 423 is coupled across coils 140 and 150, which are arranged in parallel, via an ignitron 424 and relays 481 and 482, respectively. The output of capacitor bank 433 is also coupled across coils 140 and 150, but with opposite polarity, via ignitron 434 and the relays 481 and 482, respectively.

A processor 440 is provided, and implements, under operator command, the functions of coil selection, timing, and sequencing. The processor 440 may comprise, for example, a microprocessor (such as a Modicon Model 84) programmed in accordance with the routine described in conjunction with FIG. 5. The processor 440 has output lines designated 440A and 440B which are coupled to firing and control circuit 450 and are operative to respectively enable the charging circuits 422 and 432 to initiate charging of the capacitor banks 423 and 433, in a predetermined sequence. Outputs 450C and 450D of firing and control circuit 450 are used to fire ignitrons 424 and 434, respectively, when their associated capacitor banks reach predetermined voltages. The outputs 440C and 440D of processor 440 respectively control the relays 481 and 482.

Figure 5:
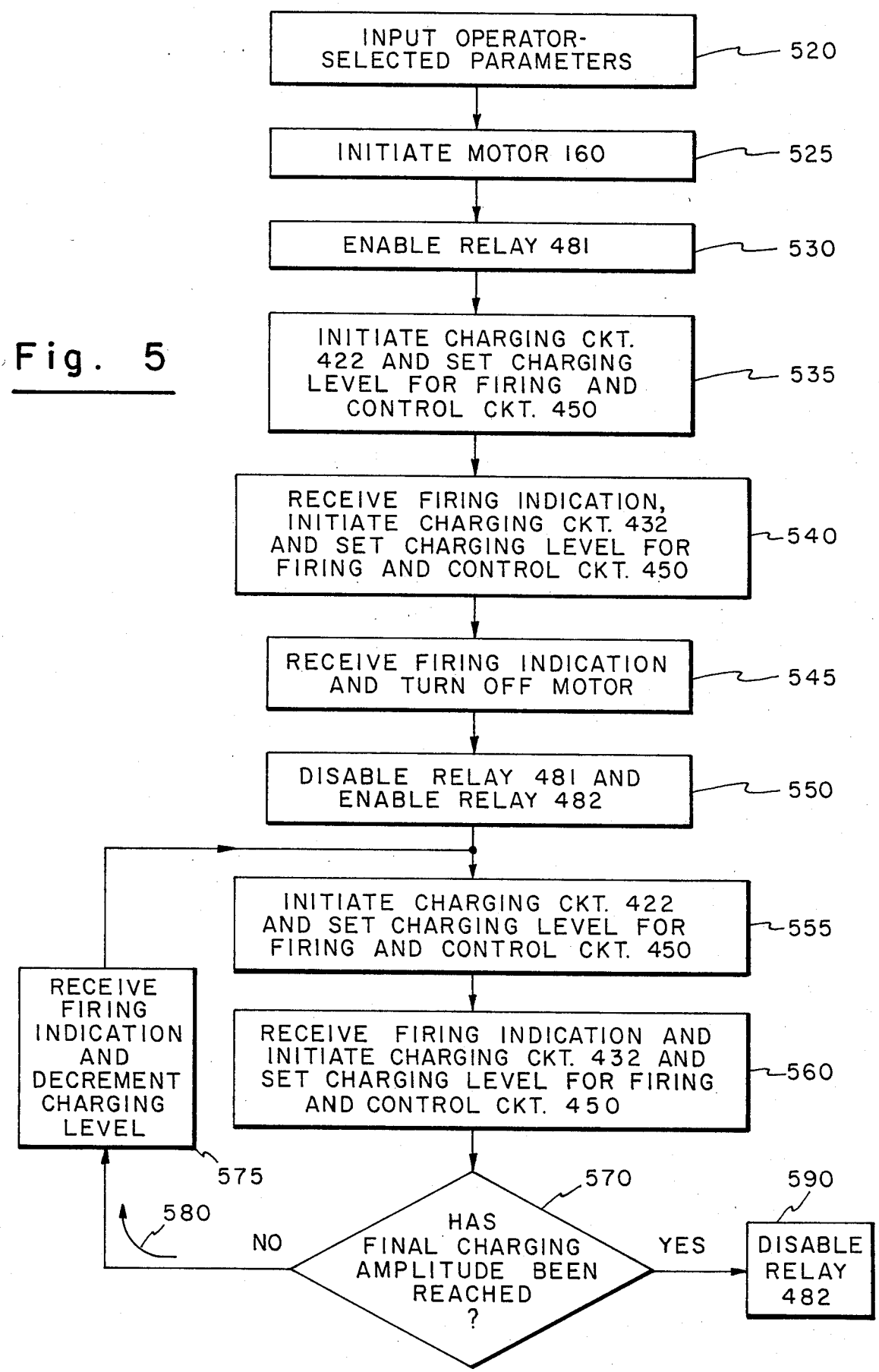
FIG. 5 is a flow diagram of a routine for processing the processor of FIG. 4 in accordance with an embodiment of the invention.

Referring to FIG. 5, there is shown a routine of a flow diagram suitable for programming the processor 440 for automatic operation of the system in accordance with an embodiment hereof. The block 520 represents the inputting of operator-selected charging and timing parameters, such as from a keyboard or control panel (not shown). It will be understood, that these parameters will typically have default values, so that they do not have to be set for each operation, although the flexibility of setting them as desired for a given application can be provided. The block 525 represents the initiation of rotation of the magnetic tape reel, by energizing motor 160. A sufficient delay can then be provided to ensure that the motor reaches the desired rotational speed. The block 530 is then entered, this block representing the enabling of the relay 481, associated with lateral coil 140. The charging of circuit 422 is then initiated, and the charging level at which firing is to occur is sent to the firing and control circuit 450, as represented by the block 535. Firing of ignitron 424 is then awaited. Upon receipt of a firing indication (or, alternatively, after sufficient elapsed time), the charging circuit 432 is initiated and the charging level at which firing and control circuit 450 will implement firing is set, as represented by the block 540. Firing of ignitron 434 is then awaited. The block 545 is then entered, this block representing the receipt of a firing indication (or, again, the passage of sufficient elapsed time), whereupon the motor 160 can be turned off. Accordingly, as described so far, during rotation of the magnetic tape reel, the transverse magnetic field is applied, first in one direction and then the other, by reversing the polarity of the capacitive discharge through the lateral coil 140.

The block 550 is then entered, this block representing the disabling of relay 481, and the enabling of relay 482, associated with the ring-shaped coil 150. The charging circuit 422 is then initiated, and the charging level at which firing is to occur is set in the firing and control circuit 450 (block 555). Upon receipt of a firing indication (or suitable passage of time, as previously described), the charging circuit 432 is initiated and the firing level is set for the firing by firing and control circuit 450 (block 560). Inquiry is then made (diamond 570), as to whether or not a predetermined final minimum charging level has been reached. If not, when the next indication that firing has occurred is received, the charging level to be used during the next cycle is decremented (block 575), and the loop 580 continues until the charging level has been decremented down to the predetermined level. In this manner, the axial magnetic fields of alternating direction and decreasing amplitude are produced, as desired. Thereupon, the relay 482 is disabled, as represented by the block 590.

The invention has been described with reference to a particular preferred embodiment, but variations within the spirit and scope of the invention will occur to those skilled in the art. For example, it will be understood that other configurations can be utilized to obtained magnetic fields having the desired directional components.

We claim:

1. A method for degaussing a reel of magnetic tape, comprising the steps of:
   (a) simultaneously rotating the magnetic tape reel on its axis and applying a transverse magnetic field substantially in the plane of the reel, the transverse magnetic field being applied first in one direction and then in the opposite direction; and
   (b) applying an axial magnetic field substantially parallel to the axis of the reel, the axial magnetic field being applied first in one direction and then in the opposite direction.

2. The method as defined by claim 1, wherein said step of applying an axial magnetic field includes applying axial magnetic fields in alternating directions at successively decreasing amplitudes.

3. The method as defined by claim 1, wherein said transverse magnetic field has a field strength of at least 1500 oersteds.

4. The method as defined by claim 2, wherein said transverse magnetic field has a field strength of at least 1500 oersteds.

5. The method as defined by claim 2, wherein the initial axial magnetic field has a field strength of at least 1500 oersteds.

6. The method as defined by claim 4, wherein the initial axial magnetic field has a field strength of at least 1500 oersteds.

7. The method as defined by claim 1, wherein said magnetic tape reel is rotated at a rate of at least 1000 revolutions per minute.

8. The method as defined by claim 2, wherein said magnetic tape reel is rotated at a rate of at least 1000 revolutions per minute.

9. The method as defined by claim 4, wherein said magnetic tape reel is rotated at a rate of at least 1000 revolutions per minute.

10. The method as defined by claim 6, wherein said magnetic tape reel is rotated at a rate of at least 1000 revolutions per minute.

11. Apparatus for degaussing a reel of magnetic tape, comprising:
    means for rotating the magnetic tape reel on its axis;
    means for applying, during said rotation, a transverse magnetic field substantially in the plane of the reel, the transverse magnetic field being applied first in one direction and then in the opposite direction; and
    means for applying an axial magnetic field substantially parallel to the axis of the reel, the axial magnetic field being applied first in one direction and then in the opposite direction.

12. Apparatus as defined by claim 11, wherein said means for applying an axial magnetic field comprises means for applying axial magnetic fields in alternating directions at successively decreasing amplitudes.

13. Apparatus as defined by claim 11, wherein said transverse magnetic field has a field strength of at least 1500 oersteds.

14. Apparatus as defined by claim 12, wherein said transverse magnetic field has a field strength of at least 1500 oersteds.

15. Apparatus as defined by claim 12, wherein the initial axial magnetic field has a field strength of at least 1500 oersteds.

16. Apparatus as defined by claim 14, wherein the initial axial magnetic field has a field strength of at least 1500 oersteds.

17. Apparatus as defined by claim 11, wherein said means for rotating said magnetic tape reel is operative to rotate said reel at a rate of at least 1000 revolutions per minute.

18. Apparatus as defined by claim 12, wherein said means for rotating said magnetic tape reel is operative to rotate said reel at a rate of at least 1000 revolutions per minute.

19. Apparatus as defined by claim 14, wherein said means for rotating said magnetic tape reel is operative to rotate said reel at a rate of at least 1000 revolutions per minute.

20. Apparatus as defined by claim 16, wherein said means for rotating said magnetic tape reel is operative to rotate said reel at a rate of at least 1000 revolutions per minute.

21. Apparatus as defined by claim 11, wherein said means for applying said transverse magnetic field comprises a lateral coil which passes over and under the reel.

22. Apparatus as defined by claim 12, wherein said means for applying said transverse magnetic field comprises a lateral coil which passes over and under the reel.

23. Apparatus as defined by claim 11, wherein said means for applying an axial magnetic field comprises a ring-shaped coil surrounding the periphery of said reel.

24. Apparatus as defined by claim 12, wherein said means for applying an axial magnetic field comprises a ring-shaped coil surrounding the periphery of said reel.

25. Apparatus as defined by claim 22, wherein said means for applying an axial magnetic field comprises a ring-shaped coil surrounding the periphery of said reel.

26. A method for degaussing a magnetic storage medium, comprising the steps of:
    (a) simultaneously rotating the magnetic storage medium on its axis and applying a transverse magnetic field substantially in the plane of the magnetic storage medium; the transverse magnetic field being applied first in one direction and then in the opposite direction; and
    (b) applying an axial magnetic field substantially parallel to the axis of the magnetic storage medium, the axial magnetic field being applied first in one direction and then in the opposite direction.

27. The method as defined by claim 26, wherein said step of applying an axial magnetic field includes applying axial magnetic fields in alternating directions at successively decreasing amplitudes.

* * * * *